US012794880B2

(12) United States Patent
Mossler et al.

(10) Patent No.: US 12,794,880 B2
(45) Date of Patent: Nov. 10, 2026

(54) FIRST FACTOR CONTACTLESS CARD AUTHENTICATION SYSTEM AND METHOD

(71) Applicant: Capital One Services, LLC, McLean, VA (US)

(72) Inventors: Lara Mossler, Farmville, VA (US); Kaitlin Newman, Washington, DC (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/602,158

(22) Filed: Mar. 12, 2024

(65) Prior Publication Data

US 2024/0223554 A1 Jul. 4, 2024

Related U.S. Application Data

(63) Continuation of application No. 17/532,490, filed on Nov. 22, 2021, now Pat. No. 11,956,230, which is a (Continued)

(51) Int. Cl.
*H04L 29/06* (2006.01)
*H04L 9/40* (2022.01)

(52) U.S. Cl.
CPC ...... *H04L 63/0846* (2013.01); *H04L 63/0807* (2013.01); *H04L 63/083* (2013.01); *H04L 63/0853* (2013.01)

(58) Field of Classification Search
CPC ............. H04L 63/0838; H04L 63/0846; H04L 63/083
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 1235445 A 11/1999
CN 101192295 A 6/2008
(Continued)

OTHER PUBLICATIONS

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_2012607061923900.pdf, 174 pages.
(Continued)

*Primary Examiner* — Dao Q Ho
(74) *Attorney, Agent, or Firm* — KDW Firm PLLC

(57) ABSTRACT

A password-less authentication system and method include registering a contactless card of a client with an application service and binding the contactless card to one or more client devices. The contactless card advantageously stores a username and a dynamic password. Accesses by the client to the application service may be made using any client device, and authentication of the accesses may be performed by any client device that includes a contactless card interface and can retrieve the username and dynamic password pair from the contactless card. By storing the username on the card, rather than requiring user input, application security improved because access to and knowledge of login credentials is limited. In addition, the use of a dynamic password reduces the potential of malicious access.

20 Claims, 11 Drawing Sheets

Related U.S. Application Data continuation of application No. 16/705,515, filed on Dec. 6, 2019, now Pat. No. 11,212,275, which is a continuation of application No. 16/519,079, filed on Jul. 23, 2019, now Pat. No. 10,541,995.

(56) References Cited

U.S. PATENT DOCUMENTS 6,199,114 B1 3/2001 White
6,324,271 B1 11/2001 Sawyer
6,367,011 B1 4/2002 Lee
6,572,015 B1 6/2003 Norton
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad et al.
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,141,136 B2 * 3/2012 Lee ........................ H04W 12/04 713/168
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,594,730 B2 * 11/2013 Bona .................... G06Q 20/341 455/554.2
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,501,776 B2 11/2016 Wurmfeld
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2001/0054148 A1 12/2001 Hoornaert et al.
2003/0220876 A1 11/2003 Burger
2005/0156026 A1 7/2005 Ghosh
2005/0228997 A1 10/2005 Bicker
2005/0269402 A1 12/2005 Spitzer
2007/0088820 A1 4/2007 Kwak et al.
2007/0276765 A1 11/2007 Hazel
2008/0082452 A1 4/2008 Wankmueller
2008/0099552 A1 5/2008 Grillion
2009/0143104 A1 6/2009 Loh
2009/0177882 A1 * 7/2009 Saran .................. H04L 63/0853 713/159
2009/0235339 A1 9/2009 Mennes
2009/0282264 A1 11/2009 Amiel
2011/0113245 A1 5/2011 Varadarajan
2011/0113477 A1 * 5/2011 Miyabayashi ...... H04L 63/0492 726/7
2011/0155801 A1 6/2011 Rowberry
2012/0047563 A1 * 2/2012 Wheeler ............... H04L 9/0872 726/6
2012/0143703 A1 6/2012 Wall
2013/0030997 A1 1/2013 Spodak
2013/0146657 A1 6/2013 Graef
2013/0211937 A1 8/2013 Elbirt
2013/0311363 A1 11/2013 Ramaci
2013/0318575 A1 * 11/2013 Hart ........................ G06F 21/35 726/4
2014/0020073 A1 * 1/2014 Ronda ................. H04L 63/0853 726/7
2014/0074637 A1 3/2014 Hammad
2014/0074655 A1 3/2014 Lim
2014/0081785 A1 3/2014 Valadas Preto
2014/0365377 A1 12/2014 Salama
2015/0032635 A1 1/2015 Guise
2015/0073983 A1 3/2015 Bartenstein
2015/0113271 A1 4/2015 Jooste
2015/0134513 A1 5/2015 Olson
2015/0154595 A1 * 6/2015 Collinge ............ G06Q 20/4012 705/71
2015/0199673 A1 7/2015 Savolainen
2015/0199863 A1 7/2015 Scoggins
2015/0206129 A1 * 7/2015 Perez Lafuente .. G06Q 20/4012 705/44
2015/0254637 A1 9/2015 Yang

(56) References Cited

U.S. PATENT DOCUMENTS

| | | | |
|---|---|---|---|
| 2015/0317295 | A1 | 11/2015 | Sherry |
| 2016/0078430 | A1 | 3/2016 | Douglas |
| 2016/0189143 | A1 | 6/2016 | Koeppel |
| 2016/0253651 | A1 | 9/2016 | Park |
| 2016/0261411 | A1 | 9/2016 | Yau et al. |
| 2016/0277383 | A1 | 9/2016 | Guyomar'h |
| 2016/0307189 | A1 | 10/2016 | Zarakas |
| 2016/0314472 | A1 | 10/2016 | Ashfield |
| 2016/0379217 | A1 | 12/2016 | Hammad |
| 2017/0017957 | A1 | 1/2017 | Radu |
| 2017/0039566 | A1 | 2/2017 | Schipperheijn |
| 2017/0068950 | A1 | 3/2017 | Kwon |
| 2017/0180343 | A1* | 6/2017 | de Ganon ........... H04L 63/1441 |
| 2017/0330173 | A1 | 11/2017 | Woo |
| 2018/0039987 | A1 | 2/2018 | Molino |
| 2018/0268132 | A1 | 9/2018 | Buer |
| 2018/0300716 | A1 | 10/2018 | Carlson |
| 2019/0172055 | A1 | 6/2019 | Hale |
| 2019/0303945 | A1 | 10/2019 | Mitra |
| 2021/0004806 | A1 | 1/2021 | Noe |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354520 | A1 | 11/2023 | Rule |
| 2023/0359839 | A1 | 11/2023 | Lovgren |
| 2024/0346130 | A1 | 10/2024 | Pick et al. |
| 2025/0168161 | A1 | 5/2025 | Mossler et al. |

FOREIGN PATENT DOCUMENTS

| | | | |
|---|---|---|---|
| CN | 101252435 | A | 8/2008 |
| GB | 2516861 | A | 2/2015 |
| GB | 2551907 | A | 1/2018 |
| JP | 2001352324 | A | 12/2001 |
| JP | 2006209254 | A | 8/2006 |
| JP | 2009271836 | A | 11/2009 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/cards-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 219]. Retrieved from Internet URL: https://www.computerhope.com/jargon/a/autofill.htm, 2 pages.

Author unknown, "EMV Card Personalization Specification", EMVCo. LLC., specification version 1.0, (2003) 81 pages.

Author Unknown, "EMV Contactless Specification for Payment Systems", EMVW Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809232573l9.pdf, 52 pages.

Batina et al., "SmartCards and RFID", PowerPoint Presentation for IPA Security Curse, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Fara, S.T., et al., "Investigation of Java Smart Card Technology for Multi-Task Applications", J of AI-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "Proposed NFC Payment Application," International Journal of Advanced Computer Science and Applications, 4(8):173-181 (2013).

Sauch: Getting information from an EMV chip card with Java, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: https://isi.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportantion Council White Paper (40 pages), Mar. 2008.

Ullmann et al., "On-Card User Authentication for Contactless Smart Cards based on Gesture Recognition", paper presentation LNI processings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

FIRST FACTOR CONTACTLESS CARD AUTHENTICATION SYSTEM AND METHOD

RELATED APPLICATION

This application is a continuation of U.S. patent application Ser. No. 17/532,490, filed on Nov. 22, 2021, which is a continuation of Ser. No. 16/705,515 (now U.S. Pat. No. 11,212,275), filed on Dec. 6, 2019, which is a continuation of U.S. patent application Ser. No. 16/519,079, (now U.S. Pat. No. 10,541,995), filed on Jul. 23, 2019. The contents of the aforementioned applications are incorporated herein by reference.

BACKGROUND

Many service providers use the internet to provide ]offerings to potential or current customers. The offerings may be generally provided in the form of software applications that operate using dedicated resources of the service provider.

Many application services store sensitive client content such as account numbers, personal information, purchase history, passwords, social security numbers and the like. Authentication controls must be implemented by service providers to limit unauthorized access to sensitive customer content.

Many authentication controls validate clients based on some combination of factors including knowledge factors (something the client knows), ownership factors (something the client has), and inherence factors (something the client is). Knowledge factors may include a password, partial password, pass phrase, or personal identification number (PIN), challenge response (the user must answer a question, or pattern). Ownership factors may involve something the client has in their possession (e.g., wrist band, ID card, security token, implanted device, cell phone with built-in hardware token, software token, or cell phone holding a software token). Inherence factors may relate to something the user is or does (e.g., fingerprint, retinal pattern, DNA sequence, signature, face, voice, unique bio-electric signals, or another biometric identifier).

Access to the information and services of a service provider is generally controlled via a layered security protocol designed to protect sensitive and/or critical information using multi-factor authentication techniques. Despite such efforts, service provider systems remain vulnerable to phishing, man-in-the-middle and other malicious attacks, particularly during username/password exchanges, which are particular targets of hackers that understand a user's tendency to use a common password across multiple platforms. Cryptographic encoding of passwords may impair, but does not eliminate, a malicious party's ability to interfere with client accounts.

SUMMARY

According to one aspect of the invention, a method for authorizing accesses to applications by clients includes the steps of: receiving a request to access an application from a first client device; identifying a client associated with the first client device; validating authenticity of the request by forwarding a notification of the request to a second client device associated with the client; receiving a response from the second client device, the response including authentication information including a username and a dynamic password retrieved by the second client device from a contactless card associated with the client. The method also includes comparing the username and dynamic password retrieved by the second client device against an expected username and expected dynamic password for the client. The method also includes responsive to a match between the username and the expected username and the dynamic password and the expected dynamic password, authenticating the request and launching the application at the first client device. The method also includes updating and storing the dynamic password associated with the client. Other embodiments of this aspect include corresponding computer systems, apparatus, and computer programs recorded on one or more computer storage devices, each configured to perform the actions of the methods.

According to another aspect, a system for controlling accesses to applications by clients includes: a processor; an interface configured to receive an authentication request from a second client device associated with a client to authenticate an access request, made by a first client device associated with the client, for access to an application, the authentication request including a cryptogram provided by a contactless card to the second client device, the cryptogram including a username and a dynamic password; a non-transitory storage medium including a client table including at least one entry for at least one client, the at least one entry including an expected username and an expected dynamic password for the client; program code stored on the non-transitory storage medium and operable when executed upon by the processor to: The system also includes selectively approve the authentication request in response to a first match between the username and the expected username and to a second match between the dynamic password and the expected dynamic password. The system also includes in response to an approval of the authentication request, updating the expected dynamic password for the client. Other embodiments of this aspect include corresponding computer systems, apparatus, and computer programs recorded on one or more computer storage devices, each configured to perform the actions of the methods.

According to a further aspect, a method for authorizing access to an application by a client includes the steps of: receiving a request to access an application from a first device associated with a client; identifying the client associated with the first device; validating authenticity of the request by forwarding a notification of the request to a second device associated with the client including generating a prompt for display on the second device requesting an authentication input from the client; receiving the authentication input from the second device, the authentication input including one or more of a biometric input, a query input and a contactless card cryptogram token input including a username and dynamic password retrieved by the second device from a contactless card associated with the client. The method also includes comparing the authentication input against expected authentication input for the client. The method also includes responsive to a match between the authentication input and the expected authentication input, enabling access to the application by the first device. Other embodiments of this aspect include corresponding computer systems, apparatus, and computer programs recorded on one or more computer storage devices, each configured to perform the actions of the methods.

According to another aspect, a method for launching applications hosted by a service provider includes the steps of registering a client with an application and binding a contactless card to the client. In one embodiment, binding the contactless card to the client may include retrieving a cryptogram comprising a username and a dynamic password from the contactless card, authenticating the username and dynamic password pair, associating the username and dynamic password pair with the client and storing the username and dynamic password pair for the client in memory. The method further includes updating an application interface of the client to provide a contactless card login option as part of a modified application interface.

According to a further aspect, a system for launching applications includes a client interface adapted to exchange information with one or more coupled client devices, a storage device, and a table stored in the storage device and comprising an entry for at least one client, the entry including a card identifier and a dynamic card password for the client. The system includes an authentication unit, coupled to the client interface and the table, to selectively authenticate the client in response to a comparison between the card identifier and dynamic card password stored in the table and an authentication card identifier and an authentication password retrieved from a contactless card of the client. The system may also include application launch control, coupled to the authentication unit and configured to selectively launch the application for the client in response to the selective authentication of the client.

According to another aspect, a method for launching an application includes the step of displaying a plurality of login options to a user operating a client device, the plurality of login options including a contactless card login option. The method includes, in response to selection of the contactless card login options, prompting the user to engage a contactless card with the client device to retrieve an encoded cryptogram from a storage device of the contactless card, the encoded cryptogram comprising a username and dynamic password and forwarding the encoded cryptogram to an authorization server to enable comparison of the username and the dynamic password to an expected username and an expected password for selective authentication. The method includes the step of receiving an authentication result from the authorization server and selectively launching the application in response to the authentication result.

With such an arrangement, a contactless card cryptogram exchange, which alone provides dual factor validation (knowledge of a username, dynamic password, ownership of contactless card, mobile device, etc.), may be used as a first factor authentication mechanism in a layered security protocol, thereby decreasing the potential for misappropriation of sensitive client information during client/server communications.

DETAILED DESCRIPTION

Figure 1:
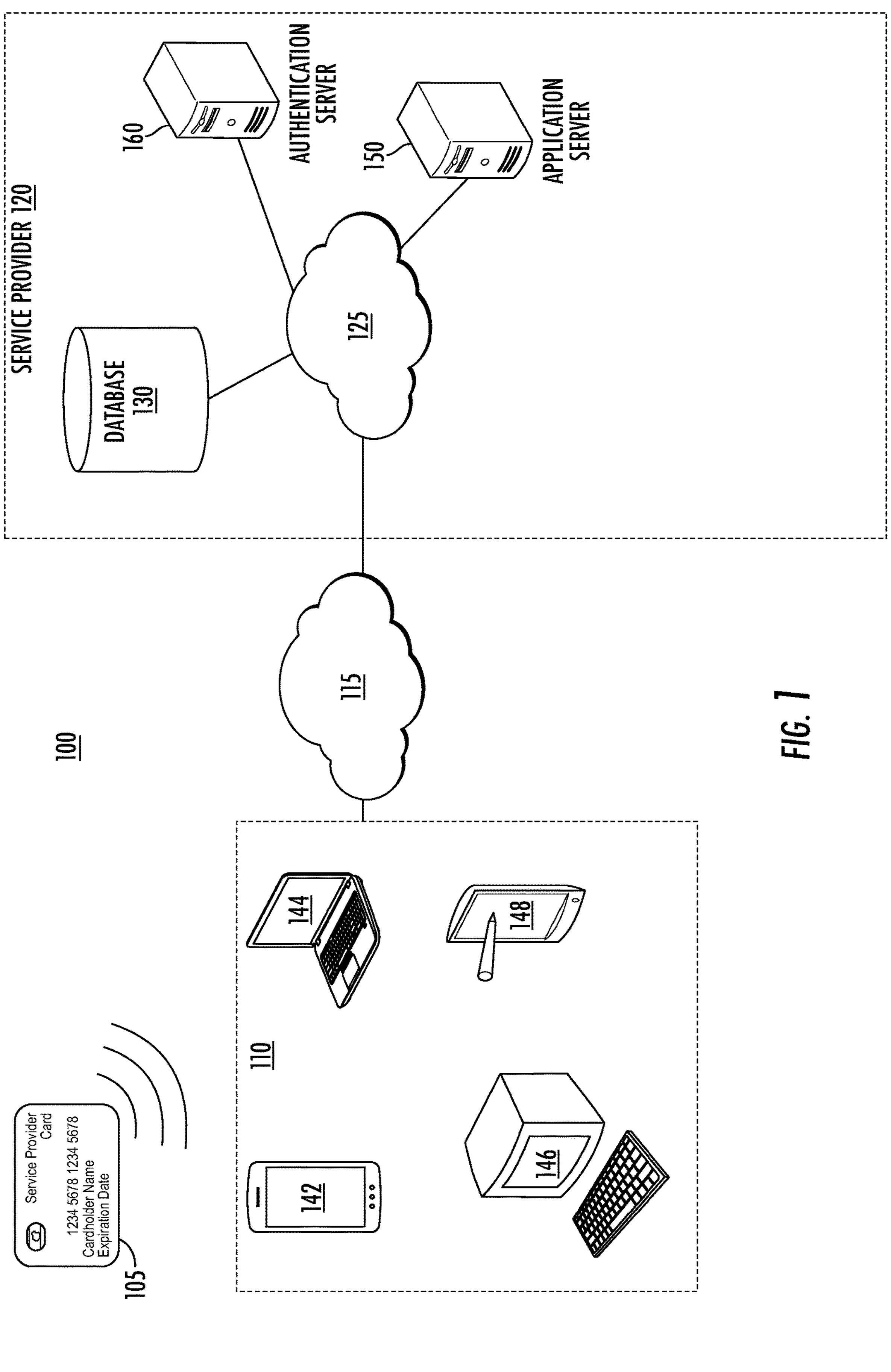
FIG. 1 is a block diagram of a data transmission system configured to pre-authenticate customer requests according to an example embodiment.

Password-less login protocols allow service providers to authenticate clients without requiring the clients to enter a password. For example, password-less email-based or text-based systems verify a user's identity using their email/text address and a complex encrypted key code. Public key authentication is another method for implementing password-less logins. Methods for password-less login using public key authentication are supported by the Fast ID Online (FIDO) Alliance. FIDO defines various authentication standards including the Universal Second Factor (U2F) protocol. The U2F protocol uses a strong second-factor authentication such as a Near Field Communication (NFC) tap or USB security token. The user is prompted to insert and touch their personal U2F device during login. The user's FIDO-enabled device creates a new key pair, and the public key is shared with the online service and associated with the user's account. The service can then authenticate the user by requesting that the registered device sign a challenge with the private key. While the U2F protocol provides improved security over password-based methods, the use of a static, private key for authentication, even when encrypted, is a point of weakness in the overall U2F security protocol.

According to one aspect, an improved password-less authentication protocol practically applies a contactless card cryptogram exchange protocol as a first-factor authentication mechanism to facilitate application service access without sacrificing application service security.

In one embodiment, a contactless card comprises a card of credit-card dimension including an embedded integrated circuit, a storage device and an interface that permits the card to communicate with a transmitting device using a Near Field Communication (NFC) protocol. An exemplary contactless card that may be used herein includes that described in U.S. patent application Ser. No. 16/205,119 filed Nov. 29, 2018, by Osborn, et al., entitled "Systems and Methods for Cryptographic Authentication of Contactless Cards" and incorporated herein by reference (hereinafter the '119 Application). The contactless card may be configured to exchange a cryptogram as part of an NFC exchange.

An improved password-less protocol includes registering a contactless card of a client with an application service, binding the contactless card to the client and using a cryptogram exchange protocol as described in the '119 Application to perform first factor, second factor and/or other authentication of client access requests by the application service. In one embodiment, the contactless card may include a memory containing one or more applets, a counter value, a plurality of keys and one or more processors configured to increment the counter value for each cryptogram exchanged with the service provider. The contactless card may be configured to create a cryptogram using the plurality of keys and the counter value, and to transmit the cryptogram, via a communication interface such as a Near Field Communication (NFC) interface, to the receiving device. According to one aspect, the cryptogram may comprise a username or other identifier of the client. In various embodiments, the username may be automatically generated for the client or defined by the client. In various embodiments, the username may be embedded in the contactless card prior to delivery of the contactless card to the client, or alternatively loaded or otherwise embedded into the contactless card as part of a registration process by the service provider. In some embodiments, the username may be hashed or encrypted using one or more hash functions, symmetric encryption algorithms and/or keys provided by the contactless card.

According to another aspect, the cryptogram may comprise a dynamic password which may be used in conjunction with the username, to perform first-factor authentication of a client when accessing an application service. In one embodiment, the dynamic password comprises the cryptogram counter, and thus the dynamic password relates to the number of cryptograms exchanged between the client and the application service; i.e., the number of times a username has been retrieved from the contactless card. With such an arrangement, the security of client/server communications is enhanced because the unpredictability of the dynamic password increases the certainty of client authenticity.

According to one aspect, binding the contactless card to the client includes associating the card with digital credentials and/or client devices. Associating the card with the digital credentials of the client may occur as part of an initial registration of the client with the service provider (i.e., a first access of an application service by the client), or alternatively prior to delivery of the contactless card to the client. In one embodiment at least one client device includes an interface for communicating with the contactless card. Once the contactless card is bound to a client device having a contactless card interface, a contactless card cryptogram exchange executed at a known client device may be used to authenticate client accesses to registered application services at any web coupled device. For example, a contactless card/mobile device cryptogram exchange may be used to authenticate a service provider access request by a client on the mobile device or at a different web-based device.

In one embodiment, application service client interfaces may be configured to suggest or mandate the use of cryptogram exchange authentication methods for application service access. Because the cryptogram exchange protocol provides dual factor validation (i.e., knowledge of the username and dynamic password and possession of the contactless card and/or client device), and because of the unpredictability of the dynamic password, the ability to use the disclosed protocol as a first factor authentication method may satisfy clients seeking high-security password-less authentication.

These and other features of the invention will now be described with reference to the figures, wherein like reference numerals are used to refer to like elements throughout. With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates a system 100 including one or more client devices 110 coupled to a service provider 120 via a network 115. According to one aspect, the client devices 110 comprise network-enabled computers and communicate with the service provider 120 via networks 115 and 125 to access service provider content and services.

As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client devices 110 thus can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, microphone, digital camera, video recorder or camcorder. These devices may be used to enter information and interact with the software and other devices described herein.

One or more client devices 110 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Various client devices 110 of FIG. 1 include a cellular phone 142, a laptop 144, a tablet 148 and a terminal 146. Client devices 110 may include a thin client application specifically adapted for communication with the service provider 120. The thin client application may be stored in a memory of the client device and be operable when executed upon by the client device to control an interface between the client device and a service provider application, permitting a user at the client device to access service provider content and services.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (WLAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

Service provider 120 is, in one embodiment, a business providing computer-based services to clients over a network 115. The combination of the software and hardware that provides a particular service of the service provider to a client is referred to herein as a 'server.' The servers may communicate over a private network 125 of the service provider, often referred to as a corporate or enterprise network. The private network 125 may comprise a wireless network, a wired network or any combination of wireless network and a wired network as described above with regard to network 115.

Software services may be embodied in an application running on an electronic device, such as a desktop application running on an operating system of a computing device, a mobile application running on a mobile operating system of a mobile device, or a web application running on a browser component of either the mobile operating system or the desktop operating system. Those skilled in the art would understand how to design, build, and deploy the software application on any type of electronic device. In some embodiments, the application may be is a browser application running on the operating system of a device.

In the system of FIG. 1, service provider 120 is shown to include an application server 150 and an authentication server 160. Although each server is illustrated as a discrete device, it is appreciated that the applications and servers may be distributed throughout the enterprise or, in the case of distributed resources such as 'cloud' resources, throughout the network 115. The application server 150 may support one or more application services provided by the service provider 120, for example, account management services. The authentication server 160, according to one aspect, may be configured to provide one or both of first-factor authentication and second-factor authentication using the contactless card as disclosed in more detail below.

Database 130 comprises data storage resources that may be used, for example, to store customer account, credential and other authentication information, including dynamic password data, for use by the application server 150 and the authentication server 160. The database 130 may be comprised of coupled data resources comprising any combination of local storage, distributed data center storage or cloud-based storage, wherein the data resources comprise non-transitory, tangible storage media, which do not include carrier waves or propagating data signals.

According to one aspect, a contactless card 105 may be in wireless communication, for example, near field communication (NFC), with one or more client devices 110. For example, contactless card 105 may comprise one or more chips, such as a radio frequency identification chip, configured to communicate via NFC or other short-range protocols. In other embodiments, contactless card 105 may communicate with client devices 110 through other means including, but not limited to, Bluetooth, satellite, and/or WIFI. As described in the '119 Application, contactless card 105 may be configured to communicate with one of a card reader terminal 146, a cellular phone 142, a laptop 144 and/or a tablet 148 through NFC when the contactless card 105 is within range of the respective client device. As will be described in more detail below, the contactless card 105 may include username, key and counter information that may be transformed using cryptographic algorithms to generate a cryptogram including the dynamic password that may be used by the service provider to authenticate the client device.

As mentioned above, according to one aspect, first-factor authentication may be implemented by exchanging a username and dynamic passwords as part of a cryptogram communication such as that described in the '119 Application. A description of an exemplary cryptogram exchange system and method will now be described with reference to FIG. 2-FIG. 5.

Figure 2:
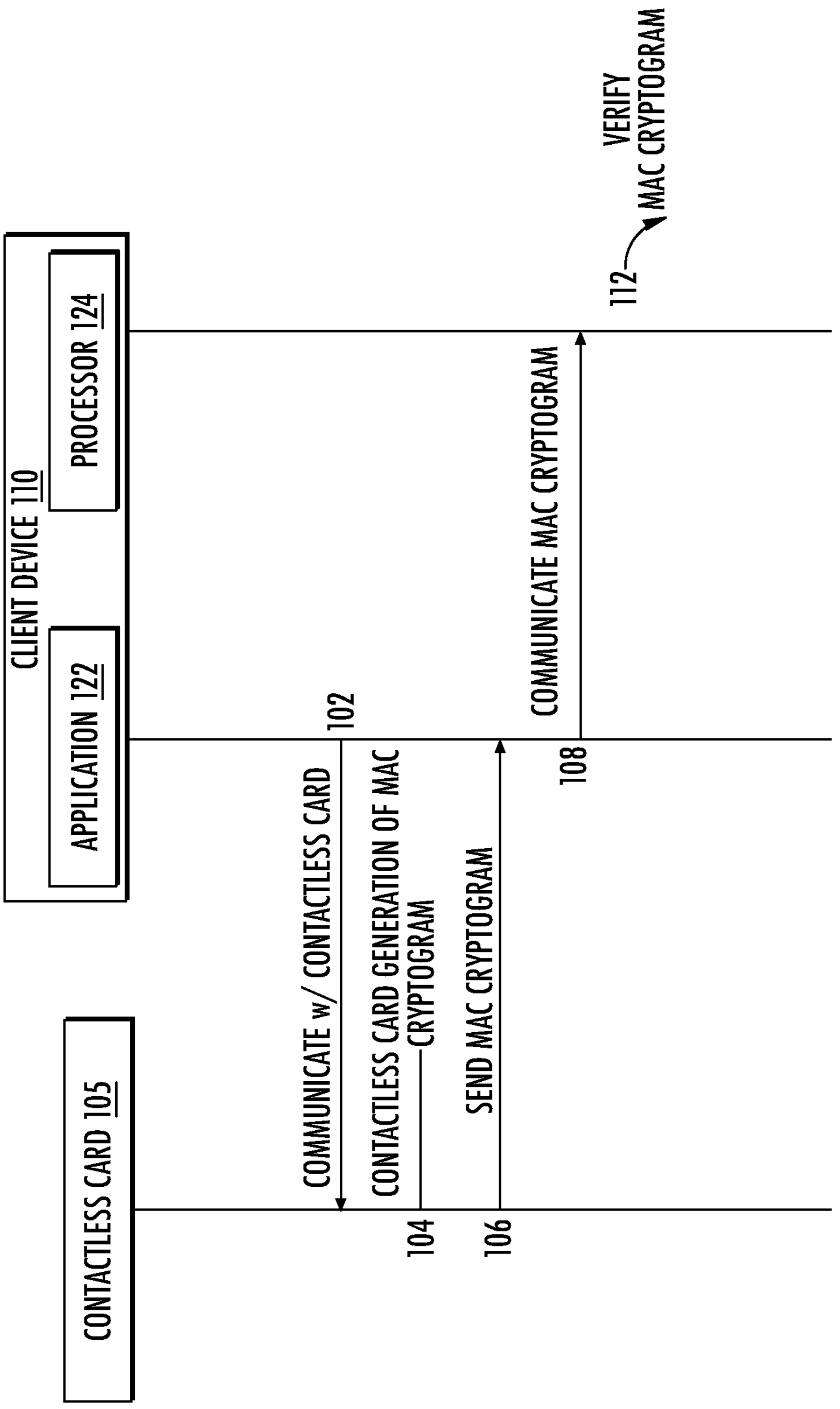
FIG. 2 is a diagram illustrating a sequence for providing authenticated access according to an example embodiment.

FIG. 2 is a data flow diagram illustrating an example workflow for authenticating a client access to a service provider application according to various aspects disclosed herein. In FIG. 2, the client device 110 is shown to include an application 122 and a processor 124. In one embodiment, the application may comprise, for example, a client-side applet comprising program code that is operable when executed on by processor 124 to control an interface between the client device 110 and a service provider application hosted by a server of the service provider network.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram in accordance with the NFC Data Exchange Format. In some examples, this may occur when the contactless card 105 is read by the application 122, for example in response to the application 122 issuing a read of a near field data exchange (NDEF) tag stored on the contactless card. At this point, a counter value maintained by the contactless card 105 may be updated or incremented, and the contactless card may generate a message including a header, a payload, and a shared secret. According to one aspect, the payload may include a username of the client, and the shared secret may include the dynamic password to be used to authenticate the client. The MAC cryptogram may be created from the message, which may include the header, payload, and the shared secret. The MAC cryptogram may then be concatenated with one or more blocks of random data, and the MAC cryptogram and a random number (RND) may be encrypted with a session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC. However, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a service provider 120 in data communication with the client device 110 (as shown in FIG. 1). For example, processor 124 may output the MAC cryptogram for transmission to the authentication server 160 of the service provider 120, which may verify the MAC cryptogram.

According to one aspect, first-factor security authentication may cause a user to engage in one or more behaviors associated with one or more contactless cards. In effect, the security factor authentication encourages the user to engage in one or more types of behaviors, including but not limited to one or more tap gestures, associated with the contactless card. In some examples, the one or more tap gestures may comprise a tap of the contactless card by the user to a device. The one or more tap gestures may be used to exchange a cryptogram comprising a username and dynamic password for purposes of authenticating client access requests at the service provider.

In one embodiment, and as described in more detail below, the contactless card includes a username, key, a counter, and cryptographic processing functionality that may be used to generate a cryptogram including a dynamic password that may be used, together with the username, to validate a user of a client device. In one embodiment, the dynamic password relates to the counter. In such an embodiment, the dynamic password thus advantageously reflects previous behaviors of the holder of the card. For example, the counter-based dynamic password may reflect the number of times that the user has previously accessed a particular service of the service provider, a knowledge factor that is virtually impossible for a malicious third party to ascertain.

Figure 3:
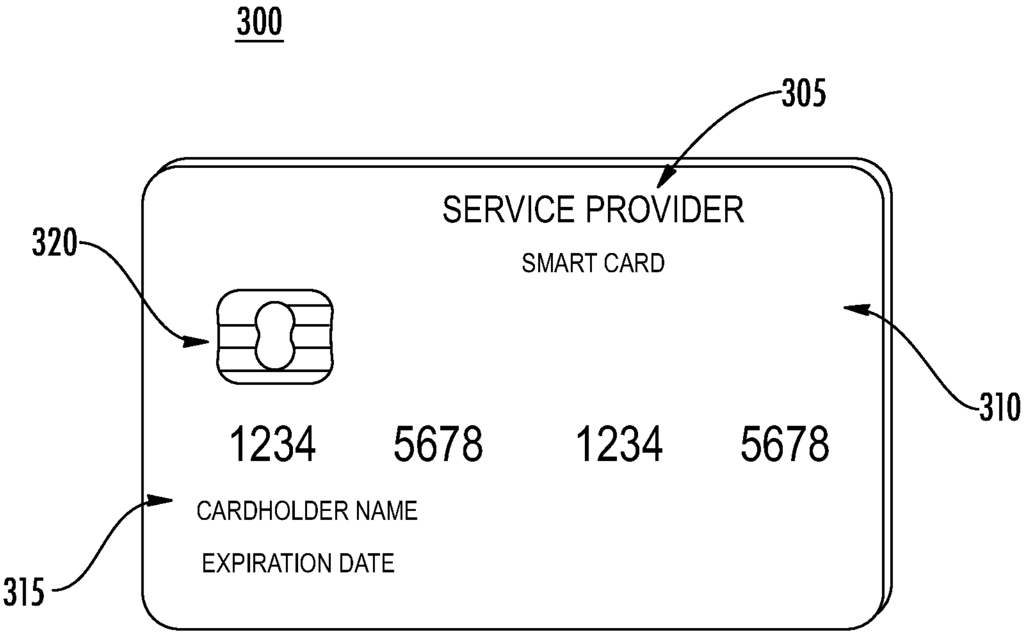
FIG. 3 is an example of a contactless card for storing authentication information that may be used in the system of FIG. 1.

FIG. 3 illustrates one or more contactless cards 300, which may comprise a payment card, such as a credit card, debit card, or gift card, issued by a service provider 305 whose identity is displayed on the front or back of the card 300. In some examples, the contactless card 300 is not related to a payment card and may comprise, without limitation, an identification card or passport. In some examples, the payment card may comprise a dual interface contactless payment card. The contactless card 300 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3. These components may be located behind the contact pad 320 or elsewhere on the substrate 310. The contactless card 300 may also include a magnetic strip or tape, which may be located on the back of the card (not shown in FIG. 3).

Figure 4:
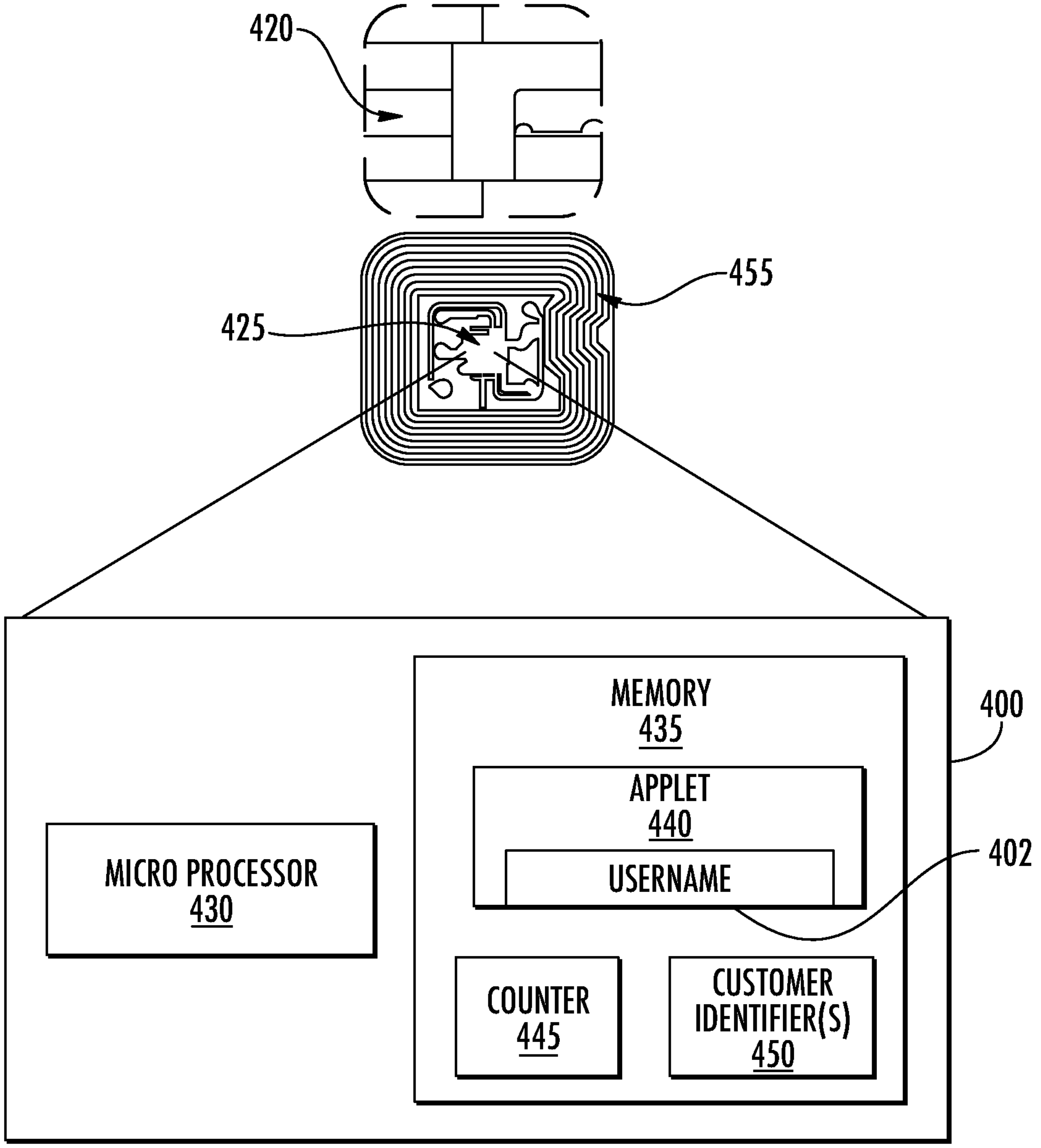
FIG. 4 is a detailed block diagram illustrating exemplary components of the contactless card of FIG. 3.

As illustrated in FIG. 4, the contact pad 420 may include processing circuitry for storing and processing information, including a microprocessor 430 and a memory 435. It is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein.

The memory 435 may be a read-only memory, write-once read-multiple memory or read/write memory, e.g., RAM, ROM, and EEPROM, and the contactless card 400 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 435 may be configured to store one or more applets 440, one or more counters 445, and a customer information 450. The one or more applets 440 may comprise one or more software applications associated with a respective one or more service provider applications and configured to execute on one or more contactless cards, such as Java Card applet. According to one aspect, each applet may store a username 402 for the client to access the service provider application associated with the applet.

The one or more counters 445 may comprise a numeric counter sufficient to store an integer. The customer information 450 may comprise a unique alphanumeric identifier assigned to a user of the contactless card 400 and/or one or more keys that together may be used to distinguish the user of the contactless card from other contactless card users. In some examples, the customer information 450 may include information identifying both a customer and an account assigned to that customer and may further identify the contactless card associated with the customer's account. According to some aspects, the username 442 may be derived from a combination of the one or more of the customer information 450 and/or one or more keys.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to microprocessor 430 and memory 335 elements located within the contact pad 420.

In some examples, the contactless card 400 may comprise one or more antennas 425 placed within the contactless card 400 and around the processing circuitry 455 of the contact pad 420. For example, the one or more antennas may be integral with the processing circuitry, and the one or more antennas may be used with an external booster coil. As another example, the one or more antennas may be external to the contact pad 420 and the processing circuitry.

As explained above, the contactless cards 400 may be built on a software platform operable on smart cards or other devices that comprise program code, processing capability and memory, such as JavaCard. Applets may be added to contactless cards to generate a one-time password (OTP) for multifactor authentication (MFA) in various mobile application-based use cases. Applets may be configured to respond to one or more requests, such as near-field data exchange (NDEF) requests, from a reader, such as a mobile Near Field Communication (NFC) reader and produce an NDEF message that comprises a cryptographically secure OTP encoded as an NDEF text tag. Thus, the functionality of the contactless card is adapted to provide a unique one-time password as part of a near-field data exchange communication as described below.

Figure 5:
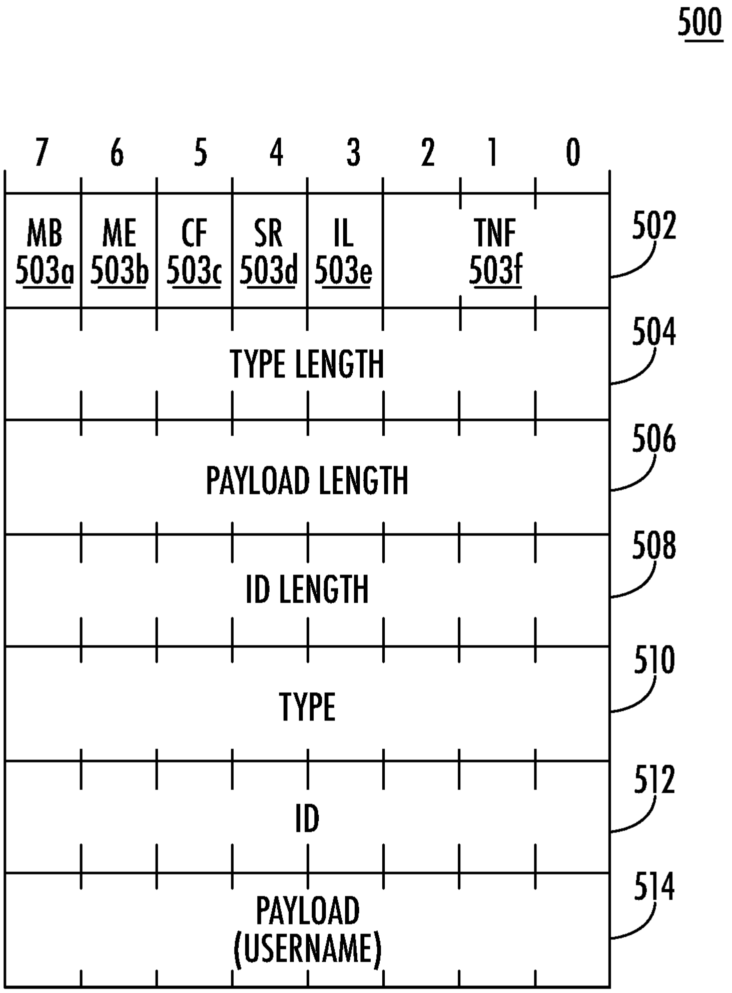
FIG. 5 is a diagram of exemplary fields of messages exchanged between a contactless card and a client device of FIG. 1.

FIG. 5 illustrates an exemplary NDEF short-record layout (SR=1) 500 according to an example embodiment. An NDEF message provides a standardized method for a client device 110 to communicate with a contactless card 105. In some examples, NDEF messages may comprise one or more records. The NDEF record 500 includes a header 502 which includes a plurality of flags that define how to interpret the rest of the record, including a Message Begin (MB) flag **503*a* a Message End (ME) flag 503*b*, a Chunk flag (CF) 503*c*, a Short Record (SR) flag 503*d*, an ID Length (IL) flag 503*e* and a Type Name Format (TNF) field 503*f*. MB 503*a* and ME flag 503*b* may be set to indicate the respective first and last record of the message. CF 503*c* and IL flag 503*e* provide information about the record, including respectively whether the data is 'chunked' (data spread among multiple records within a message) or whether the ID type length field 508 is relevant. SR flag 503*d*** may be set when the message includes only one record.

The TNF field **503*f*** identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 504, payload length 506, ID length 508, Type 510, ID 512 and Payload 514. Type length field 504 specifies the precise kind of data found in the payload. Payload Length 506 contains the length of the payload in bytes. A record may contain up to 4,294,967,295 bytes (or 2^32−1 bytes) of data. ID Length 508 contains the length of the ID field in bytes. Type 510 identifies the type of data that the payload contains. For example, for authentication purposes, the Type 510 may indicate that the payload includes a username/password pair. ID field 512 provides the means for external applications to identify the whole payload carried within an NDEF record. Payload 514 comprises the message.

In some examples, data may initially be stored in the contactless card by implementing STORE DATA (E2) under a secure channel protocol. This data may include a personal User ID (pUID) or other username that is unique to the card, as well as one or more of an initial key, cryptographic processing data including session keys, data encryption keys, random numbers and other values that will be described in more detail below. In other embodiments, the pUID or other username may be pre-loaded into the contactless card, prior to delivery of the contactless card to the client. In some embodiments, the username may be automatically generated by the service provider.

In some embodiments, a unique username may be provided for each service provider applet/service. In some embodiments, the username may be automatically generated by the service provider, and unknown to the client. In other embodiments, the username may be selected by the client as part of a registration process with a service provider application and downloaded to the contactless card as part of the registration process. Accordingly, the username may comprise any combination of automatically generated or predefined data, stored in an applet or other portion of the memory of the contactless card, may include the pUID or be a discrete value, and/or may be encrypted or encoded using hash values or keys of the contactless card.

For example, each of the client and authentication server may use one or more hash algorithms, including but not limited to the SHA-2 algorithm to encode the username. Alternatively, cryptographic algorithms that may be used to encrypt/decrypt the username and/or cryptogram payload may be selected from a group including at least one of a symmetric encryption algorithm, HMAC algorithm, and a CMAC algorithm. Non-limiting examples of the symmetric algorithms that may be used to encrypt the username and/or cryptogram may include a symmetric encryption algorithm such as 3DES (Triple Data Encryption Algorithm) or Advanced Encryption Standard (AES) 128; a symmetric Hash-Based Message Authentication (HMAC) algorithm, such as HMAC-SHA-256; and a symmetric cypher-based message authentication code (CMAC) algorithm such as AES-CMAC. It is understood that numerous forms of encryption are known to those of skill in the art, and the present disclosure is not limited to those specifically identified herein.

Following initialization, both the contactless card, client device applet and/or authentication server store information for uniquely identifying the cardholder via the username/dynamic password authentication process described herein.

Figure 6:
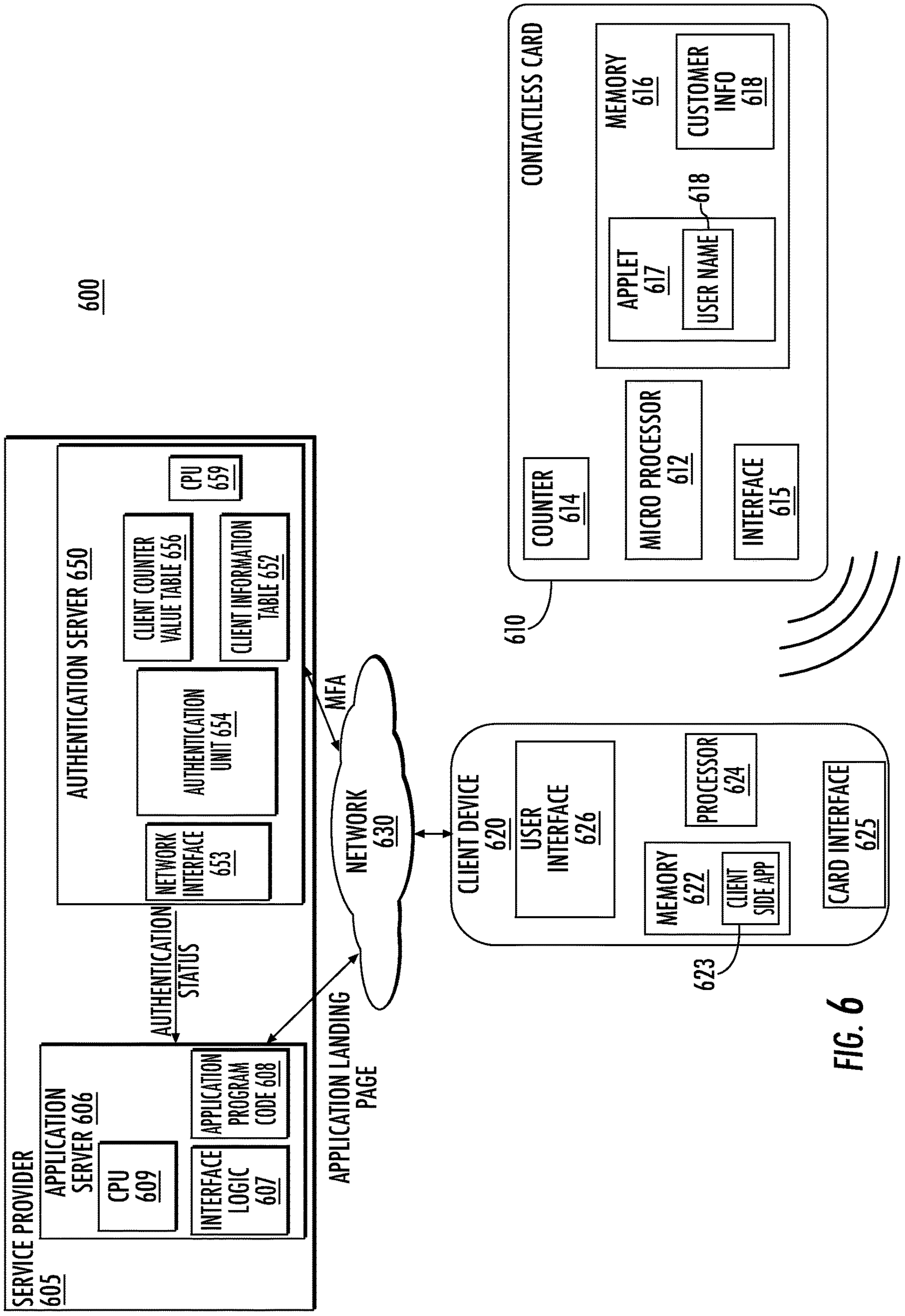
FIG. 6 is a detailed block diagram of components of the system of FIG. 1A that may be utilized to support aspects of the invention.

FIG. 6 illustrates a communication system 600 in which a contactless card 610 may store information that may be used during first-factor authentication. As described with regard to FIG. 4, each contactless card may include a microprocessor 612 and a memory 616 for customer information 618 including one or more uniquely identifying attributes, such as identifiers, keys, random numbers and the like. In one aspect, the memory further includes an authentication applet 617 operable when executed upon by microprocessor 612 for controlling authentication processes described herein. As described above, a username 618 may be stored as part of the applet and/or as part of customer information 618. In addition, each card 610 may include one or more counters 614, and an interface 615. In one embodiment the interface operates NFC or other communication protocols.

Client device 620 includes a contactless card interface 625 for communicating with the contactless card and one or more other network interfaces (not shown) that permit the device 620 to communicate with a service provider using a variety of communication protocols as described above. The client device may further include a user interface 626, which may include one or more of a keyboard or touchscreen display, permitting communication between a service provider application and a user of the client device 620. Client device 620 further includes a processor 624 and a memory 622 which stores information and program code controlling operation of the client device 620 when executed upon by the processor, including for example a client-side application 623 which may be provided to the client by a service provider to facilitate access to and use of service provider applications. In one embodiment, the client-side application 623 includes program code configured to communicate authentication information including the username and dynamic password from the contactless card 610 to one or more services provided by the service provider. The client-side app 623 may be controlled via input received at a service provider (SP) application interface 627 displayed on user interface 626. For example, a user may select an icon, link or other mechanism provided as part of the SP application interface 627 to launch the client-side application to access SP application services, where part of the launch includes validating the client using a cryptogram exchange.

In an exemplary embodiment, a cryptogram exchange includes a transmitting device having a processor and memory, the memory of the transmitting device containing a master key, transmission data, and a counter value. The transmitting device communicates with a receiving device having a processor and memory, the memory of the receiving device containing the master key. The transmitting device may be configured to: generate a diversified key using the master key and one or more cryptographic algorithms and store the diversified key in the memory of the transmitting device, encrypt the counter value using one or more cryptographic algorithms and the diversified key to yield an encrypted counter value, encrypt the transmission data using one or more cryptographic algorithms and the diversified key to yield encrypted transmission data, and transmit the encrypted counter value and encrypted transmission data to the receiving device as a cryptogram. The receiving device may be configured to: generate the diversified key based on the stored master key and the stored counter value and store the diversified key in the memory of the receiving device; and decrypt the encrypted cryptogram (comprising the encrypted counter and encrypted transmission data) using one or more decryption algorithms and the diversified key. The receiving device may authenticate the transmitting device in response to a match between the decrypted counter against the stored counter. Counters may be then be incremented at each of the transmitting and receiving devices for subsequent authentications, thereby providing a cryptogram based dynamic authentication mechanism for transmitting device/receiving device transactions.

As mentioned with regard to FIG. 1, client device 620 may be connected to various services of a service provider 605 and managed by application server 606. In the illustrated embodiment, the authentication server 605 and application server 606 are shown as separate components, although it should be appreciated that an application server may include all of the functionality described as included in the authentication server.

Application server 606 is shown to include an interface 607 and application program code 608. The interface may include a network interface, programmed to communicate with other network members via network 630 using the protocol of the network, and application program code 608, which may be stored in a non-transitory storage of Application Server 606 and operable when executed upon by the central processor unit (CPU 609) to perform the functions described herein.

Authentication server 650 is shown to include a network interface 653 for communicating with network members over network 630 and a central processing unit (CPU) 659. The authentication server may include non-transitory storage media for storing a client information table 652 including information related to clients of a service provider. Such information may include but is not limited to, the client username, client personal identifiers, and client cryptogram keys and counters. In one embodiment authentication server further includes a client counter value table 656 which may be used as described below to perform authentication in conjunction with the contactless card 610. The authentication unit 654 includes hardware and software for performing various authentication processes described with reference to FIG. 7 and FIG. 8 for clients using information from tables 652 and 656.

Figure 7:
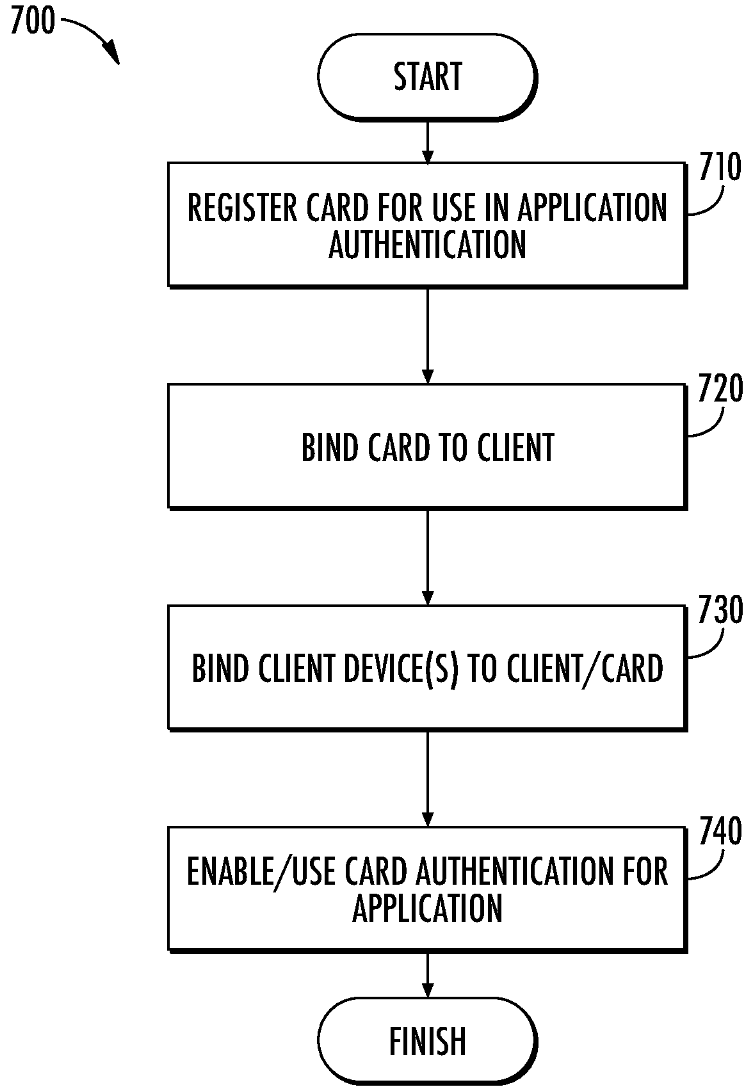
FIG. 7 is a data flow diagram provided to describe exemplary steps that may be performed to register a client, one or more client devices and/or a contactless card to enable contactless card first factor authentication as described herein.

FIG. 7 illustrates various steps of a setup process 700 that may be performed to enable password-less login to application services using a cryptogram exchange. At step 710 the contactless card of the client is registered with the application service. Registration may be performed online, offline or a combination thereof. As part of the registration, a username of the client may be stored in the client information database of one or both of the application server and the authentication server. In some embodiments, the username for the client may be automatically generated by the service provider, unknown to the client, and loaded into both the client information table of the service provider and an applet downloaded on the contactless card prior to or following delivery of the contactless card to the client. In alternate embodiments, the client may be informed of the username and/or may self-select a username for storage on the contactless card. The self-selected username may be written to the contactless card using the NFC interface described above. Such self-selection may occur upon registering the card with the application service, or alternatively as part of the process of issuing the contactless card to the client so that the contactless card is embedded with the self-selected password upon delivery to the client.

While there may be benefits to enabling a client to self-select or know a username, username knowledge is not a requirement of the password-less authentication protocol described herein because username and dynamic password information may be communicated electronically between the card, NFC enabled device and the application server, without client intervention. Such an arrangement decreases risks associated with malicious eavesdroppers of a username/password authentication method.

At step 720, the contactless card is bound to the client. In particular, the username, pUID, etc. of the contactless card is stored as part of the digital identity of the client at the service provider. The digital identity may include, for example, single sign-on (SSO) information, a profile reference identifier or other client identifier.

At step 730, once the card is registered to the client, the client and card combination may be bound to one or more client device(s). For example, the digital identity may also include client device information such as a unique identifier associated with the user device (e.g., a telephone number, an Internet Protocol (IP) address, a network identifier, a mobile equipment identifier (MEID), an international mobile subscriber identity (IMSI), a serial number, a media access control (MAC) address, and/or the like), application information related to an application that was used to capture the image (e.g., an identifier of an instance of the application, an application version of the application, a session identifier and/or the like), and/or the like.

Once the triangulation between the client, card and client device(s) has been established, at step 740 the contactless card may be used to support multi-factor secure password less login for client applications running on any client device. More generally, a cryptogram exchange that includes an encrypted username and dynamic password may be used to provide multi-factor secure password-less login for client application access.

Figure 8:
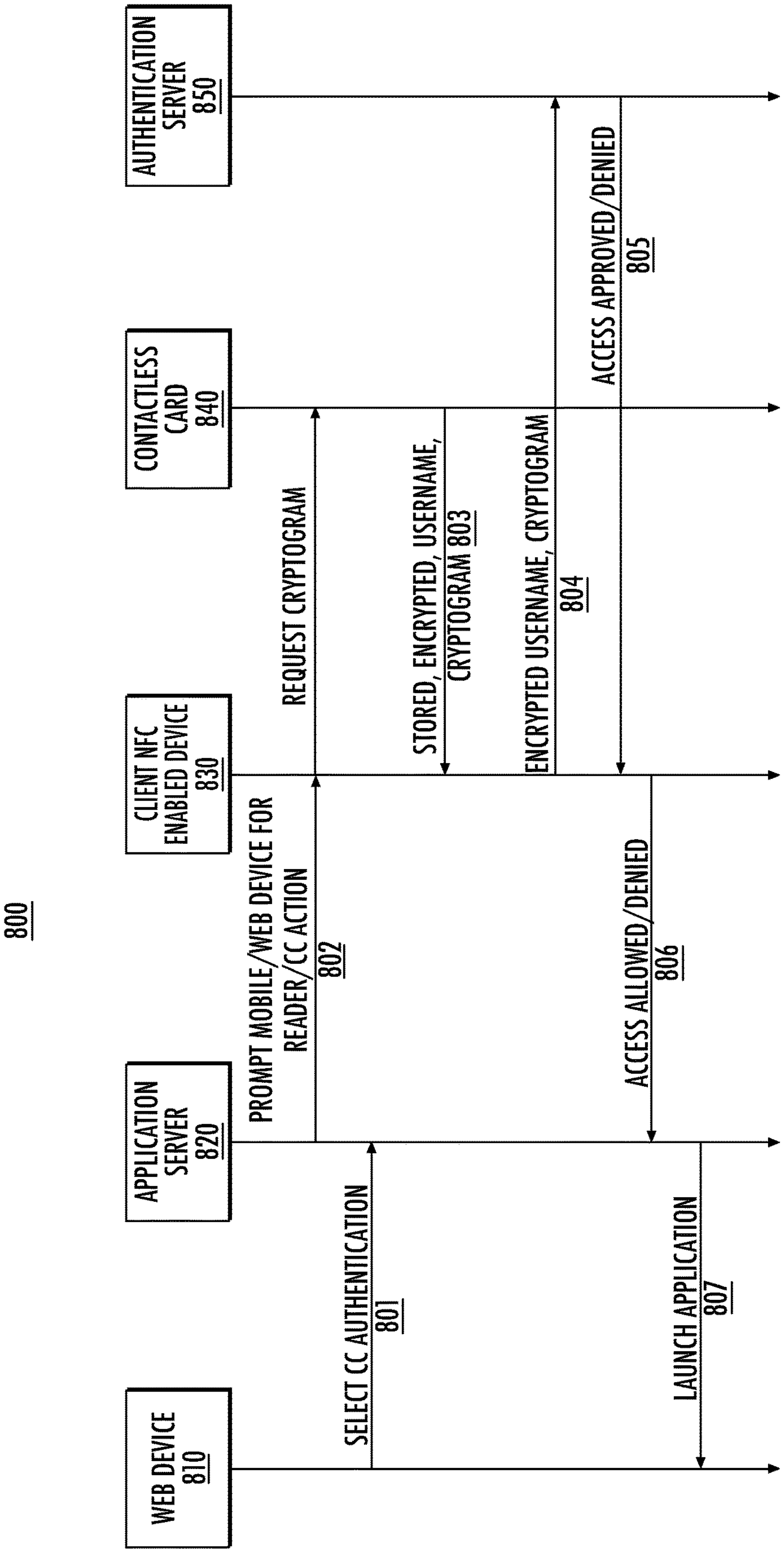
FIG. 8 is a data flow diagram provided to illustrate an exemplary embodiment of a system and method for secure password-less login using a username/dynamic password pair provided as part of a cryptogram exchange between a contactless card and a client device.

By way of example, FIG. 8 is a data flow diagram 800 provided to illustrate an exemplary embodiment of a system and method for secure password-less login using a username/dynamic password pair provided as part of a cryptogram exchange between a contactless card and a client device. In this example, an application launch request is received from a client by selection of an access option at a web-site associated with an application supported by the application server and made accessible to the client via a web browser application.

In the embodiment of FIG. 8, the client, contactless card and client device(s) have been previously registered with the application using a method similar to that described with regard to FIG. 7, and the user of the web device 810 seeking access to the application takes advantage of this association by selecting, at an application login page displayed on the web device 810, a contactless card authentication option. As a result, a contactless card authentication request is forwarded to the application server 820 at step 801.

The application server may identify the client sourcing the access request using information included within the request, for example based on the IP or MAC address of the web device or other device identifying attributes of the application access request, including but not limited to cookie data stored by the web browser on the web device 810 during previous accesses to the application, for example at registration of the client with the application.

Receiving the launch request, the application server 820 may retrieve client device information associated with the client, including, for example, identifying one or more devices of the client (such as client NFC enabled device 830) that includes authentication hardware supporting a contactless card cryptogram exchange (for example including but not limited to the components illustrated within client device 620).

In some embodiments, the web device 810 and client NFC enabled device 830 may be the same device. In other embodiments, the web device 810 and the client NFC enabled device 830 may comprise different devices. For example, in one embodiment the web device 810 may comprise a laptop device, and the client NFC enabled device 830 may comprise a mobile phone, where both the laptop device and mobile phones have been previously bound to the client. In either embodiment, the NFC enabled device 830 may work cooperatively with the contactless card 840 to authenticate the web-based access by the web device 810.

At step 802, in response to the access request, the application server 820 establishes a communication link with the client NFC enabled device 830 and forwards a notice to the client NFC enabled device over the communication link. The notice may provide a visible or audible indication that an access request is being received for an application registered to the client. The notice may additionally include a prompt for an action by the client. The prompt may take many forms and may include one or more mechanisms enabling a client to authorize the access.

Figure 9:
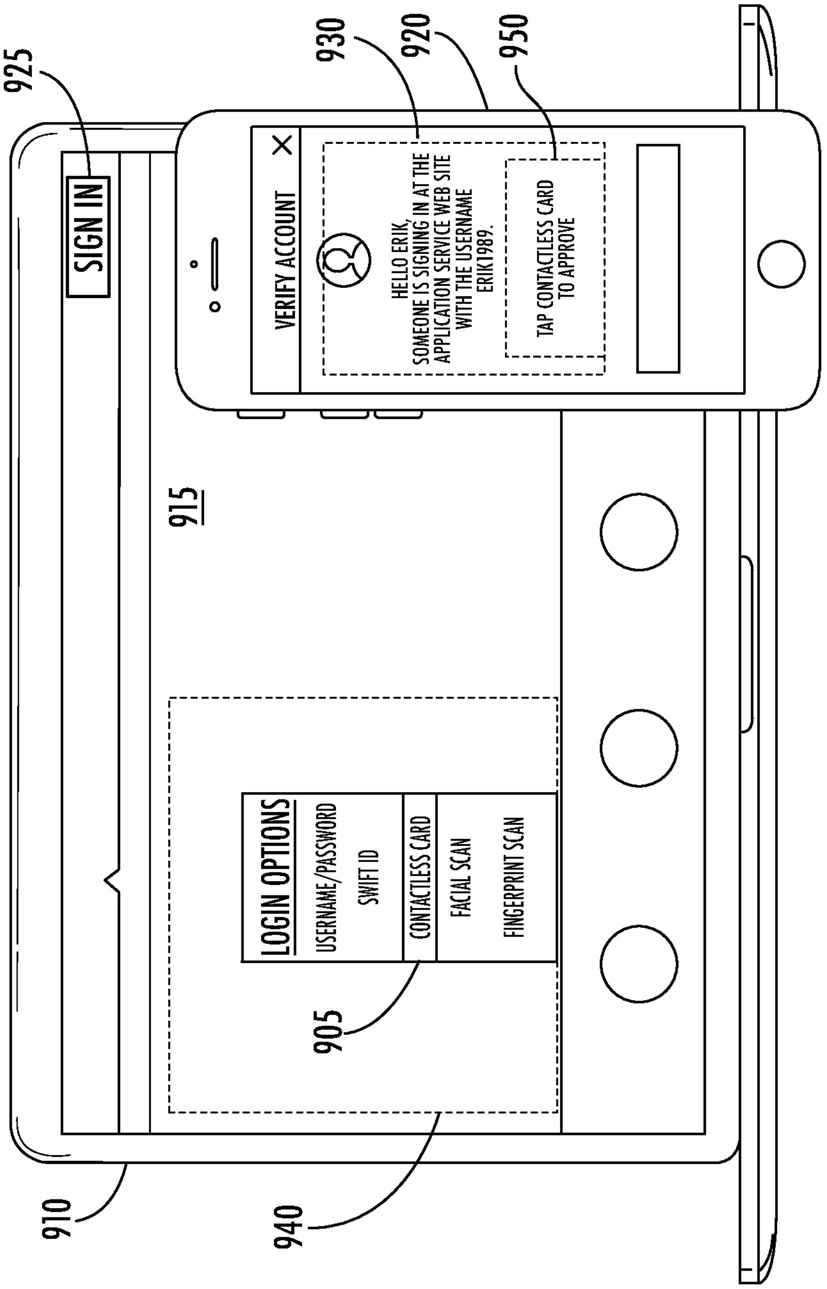
FIG. 9 illustrates exemplary user interface elements that may be provided on various client devices to support aspects disclosed herein.

By way of example FIG. 9 shows exemplary web page data and control mechanisms for a web-device 910 and a mobile device 920 configured according to aspects disclosed herein. The web-device 910 is shown to display the public facing main web page 915 of an application service web site. According to one aspect, a user may sign into the application service using a number of mechanisms which may be displayed as menu pull down options 940 upon selection of the sign in link 925. It can be appreciated that a client may generally customize sign-in option type availability and selection using web browser security settings in accordance with personal preference, and the present invention is not limited to any particular combination of the sign in options. Rather, any password-less authentication system using contactless cards or other mechanisms to provide a username and dynamic password pairs is encompassed herein.

Thus, in the embodiment of FIG. 9, a client selects the contactless card sign in option 905 to initiate application launch. In response to the selection of the contactless card sign in option 905, as described with regard to step 802, the service provider application identifies the client sourcing the request using one or more of a web cookie (i.e., information stored in the web browser of the client device by the service provider application during a previous access of the application by the client), an IP address, a MAC address, or other identifying aspect of the web device. The application service identifies an authorizing device of the client; i.e., a device of the client that is configured to accept authentication information from the client. This authorizing device may for example, comprise a mobile phone, tablet or other device having NFC capability to enable authentication using cryptogram exchanges comprising encrypted usernames and dynamic passwords.

It can be appreciated that group of client devices that are configured to authorize application access requests may vary depending upon the type of authorization requested as well as the capabilities of a particular client device. For example, authorization using facial scan utilizes an authorizing device with imaging capability. Authorization using fingerprint scan utilizes an authorizing device having fingerprint scan capability. Authorization using contactless card authentication utilizes authorizing devices comprising NFC communication capability.

In the example of FIG. 9, mobile phone 920 is identified as an authorizing client device, and the service provider application forwards a notice 930 to the authorizing device that an attempt has been made to access a service provider application registered to the client. The notice 930 is shown as a visible pop-up alert provided on the client's phone. The notice may also include a prompt 950, requesting further action by the client. For example, the prompt 950 instructs the client to 'tap the contactless card to approve'. Alternative prompts requesting only selection of a link 955 may be used depending upon a determined authentication level threshold for accessing the service provider application.

Referring to FIG. 8, if the service provider prompts for contactless card authentication at step 802, then the client engages the contactless card 840 with the NFC enabled device 830, for example by bringing the contactless card 840 into NFC proximity with the device 830. As described with regard to FIG. 2, the contactless card 840 and device 830 may then exchange a cryptogram wherein a stored, encrypted username and dynamic password are forwarded to the NFC enabled device.

According to one aspect, as described previously the authentication server 850 may be configured to store at least username, master key information and counter information for each client. The authentication server 850 may decrypt the encrypted username, comparing the decrypted username against a stored username known to correspond to the client for verifying client identity. The authentication server 850 may further decrypt the cryptogram, using a diversified key generated using a stored counter value and master key for the client, to extract the password from the cryptogram. According to one aspect, the password may comprise or be related to the counter, and thus may be dynamically updated upon each cryptogram exchange between the client and application server. The authentication server 850 compares a password extracted from the cryptogram against a stored, expected password for the client to approve or deny the application request. At step 805, the approval/denial is forwarded to the client device 830 for communication to the web device 810.

In one embodiment, communication of the approval/denial of the access request may be provided to the web device 810 via a dedicated, secure channel established by the service provider application between the application session established by web device 810 and the client NFC enabled device 830. Accordingly, approvals received by the NFC enabled device 830 may be broadcast over the channel to automatically update the application session of the web-device to launch the application. In an alternate embodiment, the application session established by the web device may monitor the communication link established between the application, and the NFC enabled device for notice of approval. The web device may periodically poll the service provider application, to determine whether it has received notice of authentication from the NFC enabled device. Upon receipt of the approval at step 806, the service provider application grants access to the web device by launching the application at step 807.

Figure 10:
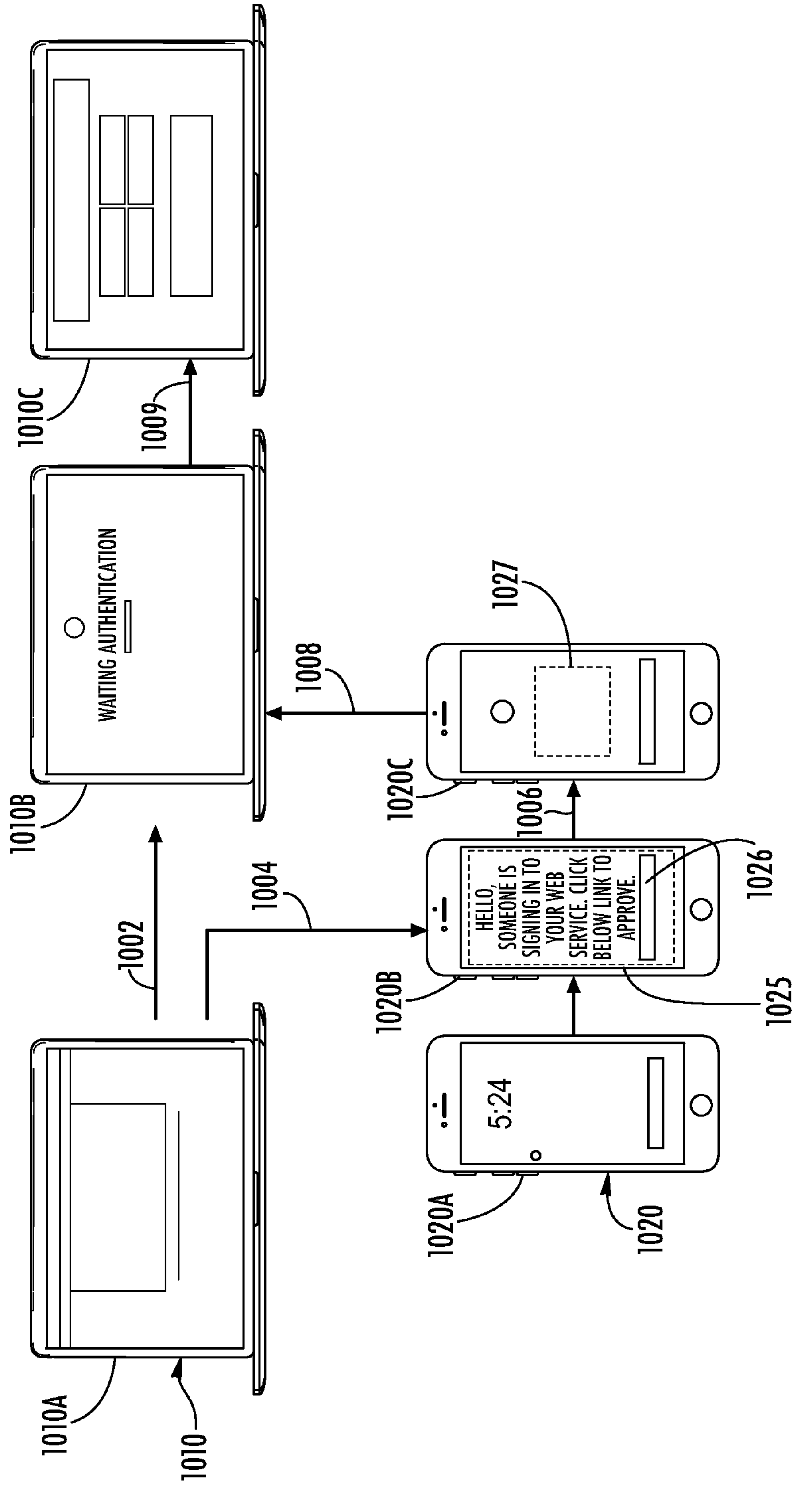
FIG. 10 illustrates exemplary user interface elements that may be provided on various client devices during the process of password-less login disclosed herein.

FIG. 10 is a temporal diagram illustrating the evolution of various display and controls provided at/by display interfaces of web device 1010 and mobile phones 1020 over time during the password-less login techniques disclosed herein. Web page 1010A illustrates a public facing login page of an application service running on web device 1010. Display 1020A shows mobile phone 1020 initially at rest. When a client attempts to access the service provider application, as discussed with regard to FIG. 8, the access request is transformed into an authentication request that is forwarded at step 1004 to the identified mobile phone device 1020, causing notice 1025 to be displayed as mobile phone display 1020B. As described above, the notice may include a prompt such as asking the client to approve the request using an input mechanism such as link selection 1026. In some embodiments, while the application service is communicating with the client device 1020/contactless card/authentication server, at step 1002 the display 1010B of web device 1010 will include a notification that the application is awaiting authentication of the client.

In some embodiments, following an initial authentication establishing possession (i.e., a client possesses a known mobile device), the application service may further prompt for an alternate form of authentication, including one that establishes identity and/or knowledge. Such an arrangement enables at least dual factor authentication with password-less login. Such forms of authentication include, but are not limited to, facial scans, fingerprint scans, query/response challenges, cryptogram username/dynamic password exchanges and the like. In such an embodiment, at step 1006 the display 1020C of the mobile phone may include an additional prompt 1027, requesting second-factor authentication, such as a facial scan, biometric or contactless card cryptogram exchange. Following receipt and validation of the second factor of authentication, at step 1008 approval is conditionally forwarded to the application service, and at step 1009 the display 1010C of the application service web site is updated to enable access by the client.

Figures 11A, 11B:
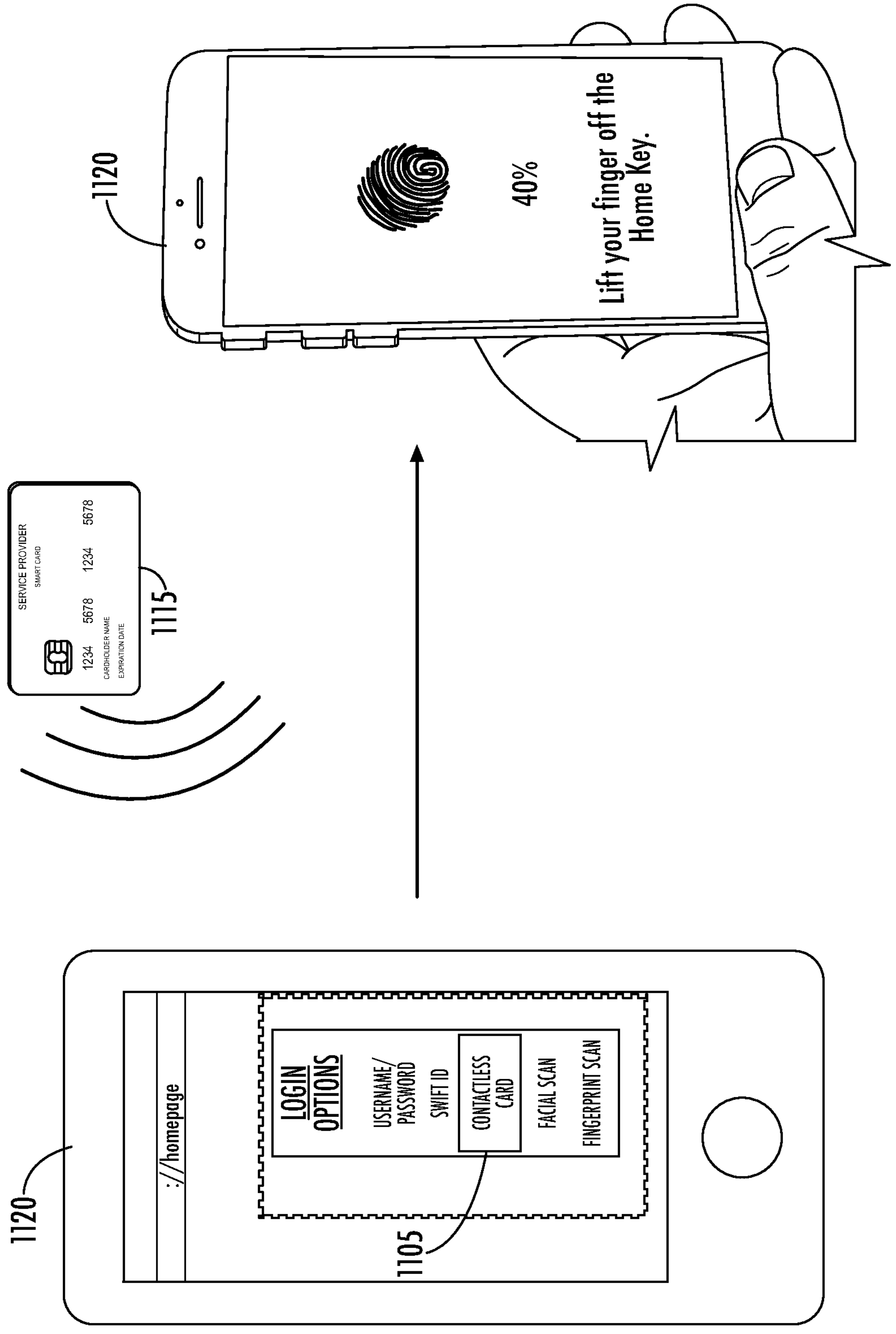
FIGS. 11A and 11B illustrate exemplary user interface elements that may enable dual factor authentication for application launch using a device.

FIGS. 11A and 11B are temporal diagrams illustrating the evolution of various display and controls provided at/by display interfaces of a mobile phones 1120 over time that is configured to implement the password-less login techniques disclosed herein. Web page 1110 illustrates a public facing login page of an application service running on web device 1120. When a client attempts to access the service provider application from the mobile phone device, a first factor authentication menu 1125 may be displayed to the user, including a selection option for a 'contactless card login' option 1105. A user may tap the contactless card 1115 to the NFC reader of the mobile device to satisfy a first factor authentication. Authentication using the processes described above proceed, with the mobile phone 1120 exchanging cryptogram authentication information with an authentication server.

Following successful contactless card authentication, as shown in FIG. 11B a second factor authentication may be requested prior to permitting access to the application service. In FIG. 11B, the second factor authentication is shown to include a biometric thumbprint authentication, although other techniques such as facial scans, voice recognition, eye scans and the like may be substituted. In some embodiments, a user may select the form of second factor authentication to use. In other embodiments, the application may select a form of second factor authentication. In any event, following successful biometric authentication, client access to the application service is then enabled.

Accordingly, a system and method for secure, passwordless authentication that uses a cryptogram exchange including a username and dynamic password for multi-factor authentication purposes has been shown and described. Such an arrangement advantageously enhances application security using an unpredictable, dynamic, encoded username password pair and a protocol that provides multi-factor authentication prior to application access.

As used in this application, the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives, a non-transitory computer-readable medium (of either optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:

registering, by one or more servers, a contactless card, wherein registration comprises storing a username and dynamic password in a client information database;

binding, by the one or more servers, a client to the contactless card by storing the username and a client identifier in a digital identity for the client in the client information database, wherein the client identifier comprises a user identifier (UID);

binding, by the one or more servers, the client and the contactless card to one or more client devices by storing, in the digital identity for the client, client device information and application information, wherein the client device information comprises a unique device identifier for each of the one or more client devices and the application information comprises an application identifier, wherein the application identifier comprises an identifier of an instance of an application, an application version of the application, a session identifier, or a combination thereof;

authenticating the contactless card based on receipt, by at least one of the servers from the contactless card via one of the client devices, of the username and the dynamic password, wherein at least the username is encoded using a hash algorithm and the dynamic password relates to a counter maintained for the client and to a number of times that the username is retrieved from the contactless card, wherein the one or more client devices comprise a first client device and a second client device, wherein the first client device and the second client device comprise different devices and the second client device is used to authenticate a request made by the first client device to access an application;

monitoring second client device communications to detect an approval of the request; and selectively launching the application in response to detection of the approval.

2. The method of claim 1, wherein at least one entry of a client table of the database comprises a master key and a counter associated with the client.

3. The method of claim 2, further comprising launching the application, wherein launching the application comprises building a communication link between a web session associated with the request and the second client device to enable the second client device to forward an authentication to the web session to launch the application.

4. The method of claim 1, further comprising prompting the client to retrieve the username and dynamic password from the contactless card associated with the client.

5. The method of claim 1, wherein one of the servers registers the username for the client and binds the contactless card to the client prior to communications with the one or more client devices.

6. The method of claim 5, wherein one of the servers generates the username for the client.

7. The method of claim 1, wherein one of the servers receives the username from the client via one of the client devices.

8. A system for controlling accesses to applications by clients includes:

a memory;

one or more processors coupled with the memory to execute program code stored in the memory to cause the one or more processors to:

store a username and dynamic password in a client table for a contactless card;

store the username and a client identifier in a digital identity for a client in the client table, wherein the client identifier comprises a user identifier (UID);

store, in the digital identity for the client, client device information and application information, wherein the client device information comprises a unique device identifier for each of one or more client devices and the application information comprises an application identifier, wherein the application identifier comprises an identifier of an instance of an application, an application version of the application, a session identifier, or a combination thereof;

authenticate the contactless card based on receipt, from the contactless card via one of the client devices, of the username and the dynamic password, wherein at least the username is encoded using a hash algorithm and the dynamic password relates to a counter maintained for the client and to a number of times that the username is retrieved from the contactless card, wherein the one or more client devices comprise a first client device and a second client device, wherein the first client device and the second client device comprise different devices and the second client device is used to authenticate a request made by the first client device to access an application;

monitor second client device communications to detect an approval of the request; and selectively launch the application in response to detection of the approval.

9. The system of claim 8, wherein one of the one or more processors generates the username for the client.

10. The system of claim 8, wherein launching the application comprises building a communication link between a web session associated with the request and the second client device to enable the second client device to forward an authentication to the web session to launch the application.

11. The system of claim 8, further comprising launching the application, wherein launching the application comprises monitoring second client device communications to detect an approval of the request and selectively launching the application in response to detection of the approvalthe one or more processors to prompt the client to retrieve the username and dynamic password from the contactless card associated with the client.

12. The system of claim 8, the one or more processors to register the username for the client and bind the contactless card to the client prior to communications with the one or more client devices.

13. The system of claim 8, the one or more processors to receive the username from the client via one of the client devices.

14. A non-transitory computer-readable storage medium, the computer- readable storage medium including instructions that when executed by a computer, cause the computer to:

register a contactless card to store a username and dynamic password in a database;

bind a client to the contactless card to store the username and a client identifier in a digital identity for the client in the database, wherein the client identifier comprises a user identifier (UID);

bind the client and the contactless card to one or more client devices to store, in the digital identity for the client, a unique device identifier for each of the one or more client devices and an application identifier, wherein the application identifier comprises an identifier of an instance of an application, an application version of the application, a session identifier, or a combination thereof;

authenticate the contactless card based on receipt, from the contactless card via one of the client devices, of the username and the dynamic password, wherein at least the username is encoded using a hash algorithm and the dynamic password relates to a counter maintained for the client and to a number of times that the username is retrieved from the contactless card, wherein the one or more client devices comprise a first client device and a second client device, wherein the first client device and the second client device comprise different devices and the second client device is used to authenticate a request made by the first client device to access an application;

monitor second client device communications to detect an approval of the request; and selectively launch the application in response to detection of the approval.

15. The computer-readable storage medium of claim 14, wherein the program code is further configured to prompt the client to retrieve the username and dynamic password from the contactless card associated with the client.

16. The computer-readable storage medium of claim 14, wherein the program code is further configured to register the username for the client and bind the contactless card to the client prior to communications with the one or more client devices.

17. The computer-readable storage medium of claim 14, wherein at least one entry of a client table of the database comprises a master key and a counter associated with the client.

18. The computer-readable storage medium of claim 14, wherein launching the application comprises building a communication link between a web session associated with the request and the second client device to enable the second client device to forward an authentication to the web session to launch the application.

19. The computer-readable storage medium of claim 14, wherein the program code is further configured to generate the username for the client.

20. The computer-readable storage medium of claim 14, wherein the program code is further configured to receive the username from the client via one of the client devices.

* * * * *